(12) United States Patent
Mitchell et al.

(10) Patent No.: US 7,558,815 B2
(45) Date of Patent: Jul. 7, 2009

(54) PROCESSING OF PERFORMANCE SENSITIVE TRANSFORMS

(75) Inventors: Joan LaVerne Mitchell, Longmont, CO (US); Arianne Therese Hinds, Boulder, CO (US)

(73) Assignee: InfoPrint Solutions Company LLC, Boulder, CO (US)

( * ) Notice: Subject to any disclaimer, the term of this patent is extended or adjusted under 35 U.S.C. 154(b) by 719 days.

(21) Appl. No.: 11/041,666

(22) Filed: Jan. 24, 2005

(65) Prior Publication Data

US 2006/0080374 A1    Apr. 13, 2006

Related U.S. Application Data

(60) Provisional application No. 60/617,381, filed on Oct. 8, 2004.

(51) Int. Cl.
*G06F 17/14*    (2006.01)

(52) U.S. Cl. .................................................. 708/402

(58) Field of Classification Search ................. 708/400, 708/550, 551, 402
See application file for complete search history.

(56) References Cited

U.S. PATENT DOCUMENTS

| 6,101,523 | A  | * | 8/2000  | Chen et al. | 708/700 |
| 7,188,132 | B2 | * | 3/2007  | Nakayama    | 708/400 |
| 7,284,026 | B2 | * | 10/2007 | Nakayama    | 708/400 |

* cited by examiner

*Primary Examiner*—Chuong D Ngo
(74) *Attorney, Agent, or Firm*—Duft Bornsen & Fishman LLP

(57) ABSTRACT

The present invention provides a method, apparatus, and article of manufacture for controlling truncation error which is introduced when performing a transform equation as a result of lowering the precision of elements of the equation using shift right operations. This is achieved by associating a predetermined truncation amount with a plurality of operations of the transform equation and defining an ordered set of the operations to perform the transform which control the truncation error in the result if each operation introduced the predetermined truncation amount associated with it. Accordingly the transform is performed using the defined ordered set. For example the pre-determined truncation error could be an average truncation error.

18 Claims, 11 Drawing Sheets

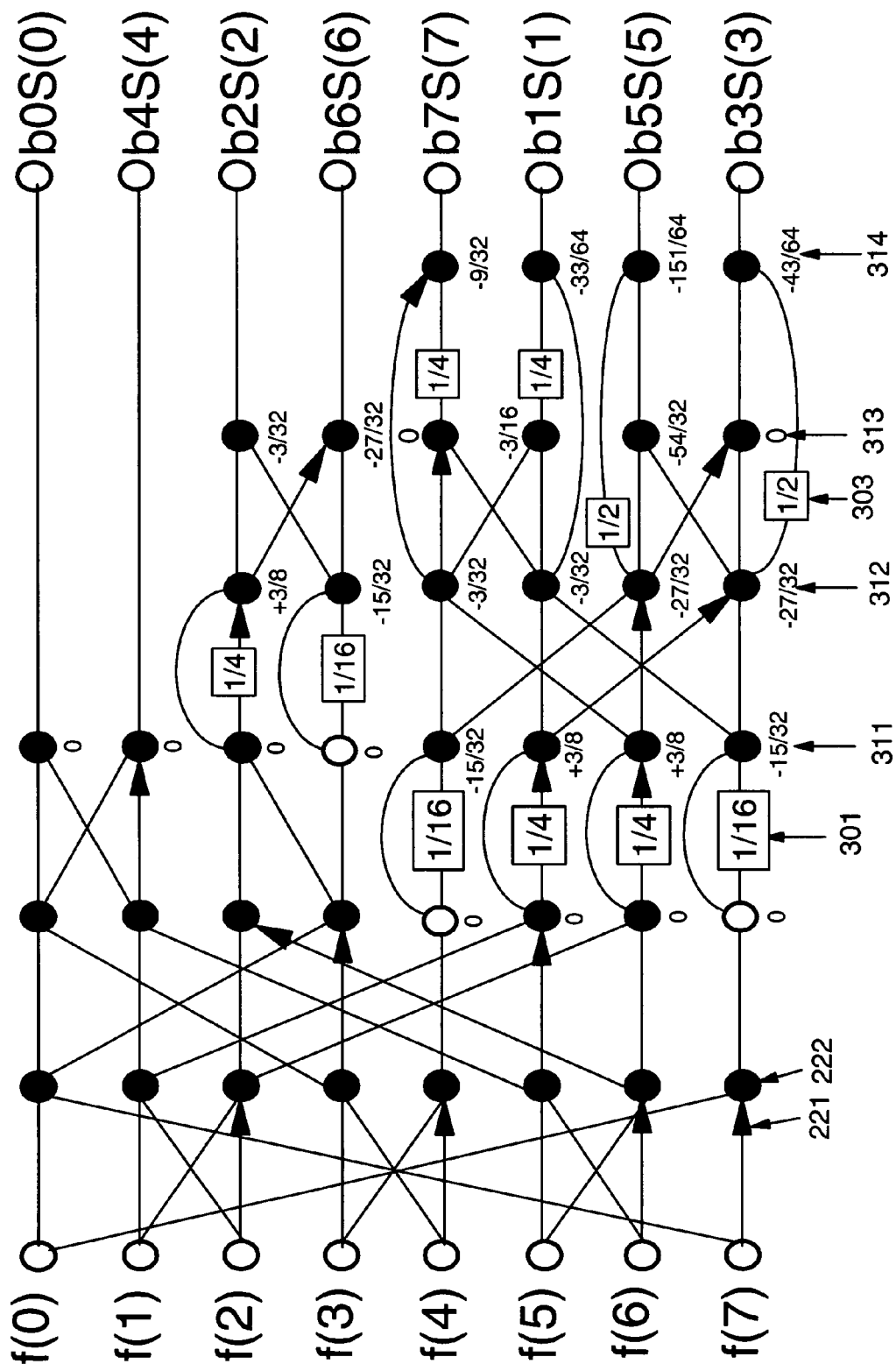

PROCESSING OF PERFORMANCE SENSITIVE TRANSFORMS

CROSS REFERENCE TO RELATED APPLICATIONS

The present application is related to and claims priority from Provisional Application 60/617,381 filed on Oct. 8, 2004, the content of which in incorporated herein.

BACKGROUND TO THE INVENTION

1. Field of the Invention

The present invention relates to the processing of performance sensitive transforms and more particularly improved processing of performance sensitive transforms 2. Description of the Related Art Today's image processing applications require ever increasing processing power as image resolution and quality demands increase. For example, a high-end production continuous-tone color digital printer prints four separate colors (CMYK) on both sides of a 24 inch wide paper at six inches per second. The combined (four colors×one byte per color× 24 inches wide×six inches per second×two sides) output rate of 1152 square inches per second at a resolution of 600 pixels (or pels) per inch requires a total image throughput rate of 415 megabytes per second. This is already several times the rates of High Definition TV (HDTV) video output data streams. Fortunately, there are eight print-heads and the printer has only 16 shades per color (four bits per pel), so the output to each print engine is a more manageable 25 megabytes per second. Leaving the data encoded in JPEG during transmission to the hardware, and decoding the data in the hardware further cuts down on the total bandwidth required.

However, future printers are likely to have twice the resolution on each axis and print at least an order of magnitude faster. Thus the demand for processing power for high end color printers is increasing much more rapidly than Moore's law.

The application of these processing demands is in no way unique to printing. Image processing is now a pervasive technology in hardware domains that have neither the cooling capabilities nor the processing power of high speed color printers. These include domains without special purpose hardware; where the processing power is limited to the strength and life of a battery (e.g. personal data assistants (PDAs), or cellular telephones), or to technology long since deployed such as in orbiting satellites.

One approach to meeting the increasing demands for image processing applications is to mitigate the processing requirements of these applications themselves. That is, simplify the implementation and power requirements of the underlying digital filter (i.e. transform), and parallelize the corresponding transform algorithm. This approach is in contrast to simply improving the hardware (i.e. Moore's law) such that the algorithms execute faster.

The Discrete Cosine Transform (DCT) is a widely used transform for image processing, for example it is the transform used in both the JPEG (for example see: J. L. Mitchell, W. B. Pennebaker, JPEG Still Image Data Compression Standard, Van Nostrand Reinhold: New York© 1993) and MPEG (for example see: J. L. Mitchell, W. B. Pennebaker, D. LeGall, and C. Fogg, MPEG Video Compression Standard, Chapman & Hall: New York © 1997.) standards. By its mathematical definition, it is a computationally complex algorithm defined by cosine multiplications to accomplish the transformation of data into and from the frequency domain.

An example of an order-eight one dimensional (1-D) DCT can be described with the following mathematical definitions.

FDCT
$$S(u) = (Cu/2)\sum_{x=0}^{7} f(x)\cos[(2x+1)u\Pi/16]$$

IDCT
$$f(x) = \sum_{u=0}^{7} (Cu/2)S(u)\cos[(2x+1)u\Pi/16]$$

where $Cu = 2^{-1/2}$ for $u = 0$ $Cu = 1$ for $u > 0$ $x = 0, 1, \ldots, 7$ $u = 0, 1, \ldots, 7$ $S(u)$ = the DCT coefficients $f(x)$ = the input sample data Note the computations required for each output of the forward DCT (FDCT): eight cosine multiplications, seven additions, and one multiplication by the constant Cu, while the inverse DCT (IDCT) is equally as complex. As a result, because a transform implementation with this amount of complexity is unacceptable in most image and video compression applications, many fast and efficient implementations of the DCT have been proposed in which the complexity of the algorithm is mitigated through various means.

For example, the Vetterli and Ligtenberg fast 1-D DCT (see: Martin Vetterli and Adriaan Ligtenberg, "A Discrete Fourier-Cosine Transform Chip", IEEE Journal on Selected Areas in Communications, Vol. SAC-4, No. 1, pp. 49-61, January 1986) reduces the total number of operations for all eight outputs to 13 multiplications and 29 additions by exploiting the trigonometric properties of the equations. The Arai, Agui, and Nakajima (AAN) DCT (see: Y. Arai, T. Agui, and M. Nakajima, "A Fast DCT-SQ Scheme for Images", Transactions of the IEICE E 71(11):1095, November 1988) demonstrates the ability to scale the DFT to a DCT, thus producing a scaled DCT. In this DCT, the quantization step is exploited to include the scale terms necessary to convert the DFT outputs into DCT outputs.

J. Bracamonte, P. Stadelmann, M. Ansorge, F. Pellandini, "A Multiplierless Implementation Scheme for the JPEG Image Coding Algorithm", NORSIG 2000, IEEE Nordic Signal Processing Symposium, Kolmarden, Sweden, June 2000, pp. 17-20, describes the implementation of the 1-D DCT using the AAN algorithm, but with cosine multiplications implemented in terms of dyadic rationals (i.e. shift and add operations).

"Fast Multiplierless Approximations of the DCT With the Lifting Scheme", Jie Liang, Trac D. Tran, IEEE Transactions on Signal Processing Vol. 19, No. 12, December 2001, also discloses the implementation of a multiplierless DCT but using lifting functions.

Further, improvements to DCT processing have been described in the following co-pending and commonly-assigned patent applications: "Reducing errors in performance sensitive transformations" to Hinds et al., having application Ser. No. 10/960,253; "Compensating for errors in performance sensitive transformations" to Hinds et al., having application Ser. No. 10/960,255; and "Approximations used in performance sensitive transformations which contain sub-transforms" to Mitchell et al., having application Ser. No. 11/041,563. Ser. No. 10/960,253 discloses replacing the cosine constants in a transform equation with approximations which comprise an integer numerator and a common floating point denominator. Ser. No. 10/960,255 further improves on Ser. No. 10/960,253 by modifying the result of the DCT using an adjustment factor to compensate for errors introduced as a result of the approximation used. Ser. No. 11/041,563 also improves on Ser. No. 10/960,255 by considering each sub-transform of the transform equation separately when selecting the approximations to replace the cosine constants.

However faster and more accurate DCT implementations are an on-going need in the industry and such implementations may make use of parallel processing by loading several elements into one register such that a single operation on the register acts on each element loaded into the register. However, in order to exploit such parallel processing to its full it is necessary to keep elements small whilst at the same time controlling the introduction of error caused by lowering the precision of the elements.

SUMMARY OF INVENTION

The present invention addresses this problem by controlling the growth of the average truncation error which is introduced when the precision of element is lowered as a result of implementing results using shift right operations.

Accordingly, according to a first aspect the present invention provides a method comprising: performing at least one equation; each step of performing an equation comprising performing an ordered set of operations each of which is performed on an input and produces an output, a subsequent operation in the ordered set taking as an input the output of one or more previous operations, and the final operation producing a result; wherein a plurality of the operations have an associated pre-determined truncation amount, and the ordered set of operations of each equation is defined to control the cumulated pre-determined truncation amount in each result if performance of each operation with an associated pre-determined truncation amount resulted in introduction of a truncation amount equal to its associated pre-determined truncation amount.

According to a second aspect the present invention provides data processing apparatus comprising: a transformer for performing at least one equation, each step of performing each equation comprising performing an ordered set of operations, each operation being performed on at least one input and producing an output, a subsequent operation takes as input the output of one or more previous operations, the final operation producing a result; wherein a plurality of the operations have an associated pre-determined truncation amount, and the ordered set of operations of each equation is defined to control the cumulated pre-determined truncation amount in each result if performance of each operation with an associated pre-determined truncation amount resulted in introduction of a truncation amount equal to its associated pre-determined truncation amount.

According to a third aspect the present invention provides an article of manufacture comprising a program storage medium readable by a computer, the medium tangibly embodying one or more programs of instructions executable by a computer to perform a method for performing a transform equation, the method comprising: performing at least one equation; each step of performing an equation comprising performing an ordered set of operations each of which is performed on an input and produces an output, a subsequent operation in the ordered set taking as an input the output of one or more previous operations, and the final operation producing a result; wherein a plurality of the operations have an associated pre-determined truncation amount, and the ordered set of operations of each equation is defined to control the cumulated pre-determined truncation amount in each result if performance of each operation with an associated pre-determined truncation amount resulted in introduction of a truncation amount equal to its associated pre-determined truncation amount.

According to a fourth aspect the present invention provides a method comprising: producing computer executable program code; providing the program code to be deployed to and executed on a computer system; the program code comprising instructions for: performing at least one equation; each step of performing an equation comprising performing an ordered set of operations each of which is performed on an input and produces an output, a subsequent operation in the ordered set taking as an input the output of one or more previous operations, and the final operation producing a result; wherein a plurality of the operations have an associated pre-determined truncation amount, and the ordered set of operations of each equation is defined to control the cumulated pre-determined truncation amount in each result if performance of each operation with an associated pre-determined truncation amount resulted in introduction of a truncation amount equal to its associated pre-determined truncation amount.

For example, if two equations are performed and at least one of the operations with an associated pre-determined truncation amount is common to at least two equations the object of controlling the cumulative pre-determined truncation amount in each result can include consideration of all results. For example the object could be to minimize the sum of the modulus value of the cumulative pre-determined truncation amounts in each result. Alternatively, for example, the object could be to minimize the worse case modulus cumulative truncation amount from each result. Note that in this context a modulus value is the absolute value, regardless of sign.

The pre-determined truncation amounts could be determined according to many algorithms. Preferably they are determined based on the average truncation amount which may be introduced by the operation with which they are associated. For example such an average can be calculated based on all possible bit values of the inputs on which the relevant operation is performed having an equal probability of occurring. Alternatively the probability of each occurring could be based on an alternative distribution, for example as could be determined using empirical data. Further such an average could be a mean, mode (most frequent) or median. Alternatively, for example, the pre-determined truncation amounts could be determined based on a maximum truncation amount which may be introduced by the operation with which they are associated.

In order to best control the cumulated predetermined truncation amount and minimize the operation involved it may be preferable to produce a negated result. In this case, if a scaling factor is applied to the result in order to compensate for approximations used when performing the transform, a negative scale factor is used to produce a result of the correct sign.

Preferably the cumulative pre-determined truncation amount of the result of an equation is used to determine a correction value which is then used to modify either an input to the equation or the result of the equation, in order to compensate for an actual truncation amount in the result. For example the correction term may be applied in a rounding step in which a rounding value is added to the result which is then truncated. In this case the rounding value can include the correction value. For example the rounding value could be 0.5 minus the correction value.

In this case the change in the result from modifying it using the correction value may be limited to a predetermined value. For example if the transform equations are being used to process a JPEG image the change may be limited to a single quantization level and/or to prevent moving a value out of the 0 quantization level.

Note that providing the program instruction code for deployment to a computer system can be achieved in many different ways. For example the program code could be provided for placement in storage which is accessible to a remote computer system and from which such computer systems can download the program code. For example the storage may be accessible from an internet site or an ftp (file transfer program) site. Alternatively the program code could be provided by transmission to the computer system over a computer network, for example as part of an e-mail or other network message transmission.

BRIEF DESCRIPTION OF THE DRAWINGS

Some of the purposes of the invention having been stated, others will appear as the description proceeds, when taken in connection with the accompanying drawings, in which:

FIG. 3b is the flow-graph of FIG. 3a with average truncation amounts added;

FIG. 5a is a flow diagram of the C1/C7 rotation of FIG. 3a;

FIG. 5b is a flow diagram of the C3/C5 rotation of FIG. 3a;

DETAILED DESCRIPTION OF THE ILLUSTRATIVE EMBODIMENTS

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Figure 1:
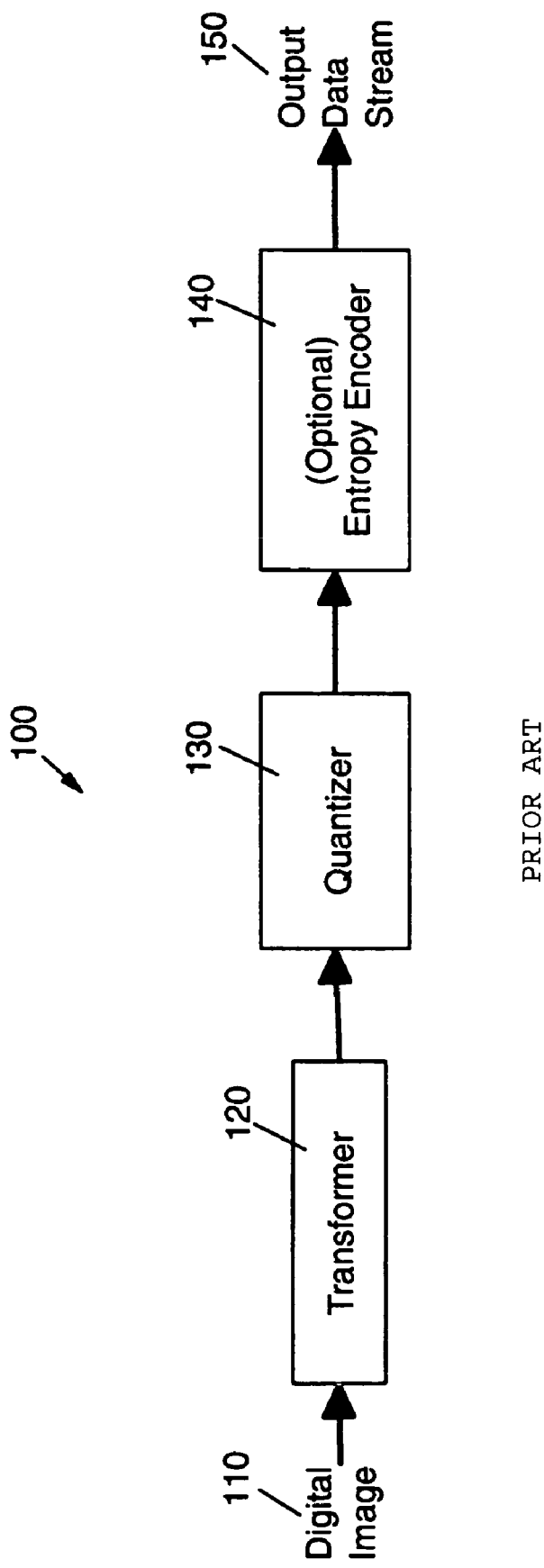
FIG. 1 is prior art image compression system 100 in which the present invention could be advantageously applied.

FIG. 1 illustrates a prior art image compression system 100 in which the present invention could be advantageously applied. The image compression system may include three closely connected components namely (a) Transformer 120, (b) Quantizer 130, and (c) Optional Entropy Encoder 140. Compression is accomplished by applying a transform to de-correlate the image data 110, quantizing the resulting transform coefficients, and, if desired, entropy coding the quantized values. A variety of linear transforms have been developed which include Discrete Fourier Transform (DFT), Discrete Cosine Transform (DCT), Discrete Wavelet Transform (DWT) and many more, each with its own advantages and disadvantages.

The quantizer 130 simply reduces the number of bits needed to store the transformed coefficients by reducing the precision of those values. Since this is a many-to-one mapping, it is a lossy process and is a significant source of compression in an encoder. Quantization can be performed on each individual coefficient, which is known as Scalar Quantization (SQ). Quantization can also be performed on a collection of coefficients together, and this is known as Vector Quantization (VQ). Both uniform and non-uniform quantizers can be used depending on the problem at hand.

The optional entropy encoder 140 further compresses the quantized values losslessly to give better overall compression. It uses a model to accurately determine the probabilities for each quantized value and produces an appropriate code based on these probabilities so that the resultant output code stream will be smaller than the input stream. The most commonly used entropy encoders are the Huffman encoder and the arithmetic encoder, although for applications requiring fast execution, simple run-length encoding (RLE) has proven very effective.

For example, a 1-D DCT is used to decompose a set of 8 grayscale samples to their underlying spatial frequencies. Further a 1-D DCT can be extended to apply to 2-D images which require 8×8 arrays of samples blocks. This is because 2-D sample blocks can be processed by multiplying a horizontally oriented set of 1-D DCT functions by a vertically oriented set of the same functions, such an arrangement being a 2-D DCT. However for the purposes of describing the preferred embodiment of the present invention a 1-D DCT will be used, and a skilled person will realize that this can be considered equivalent to processing the top row of 8×8 2-D image blocks, such as for a JPEG image.

Figure 2:
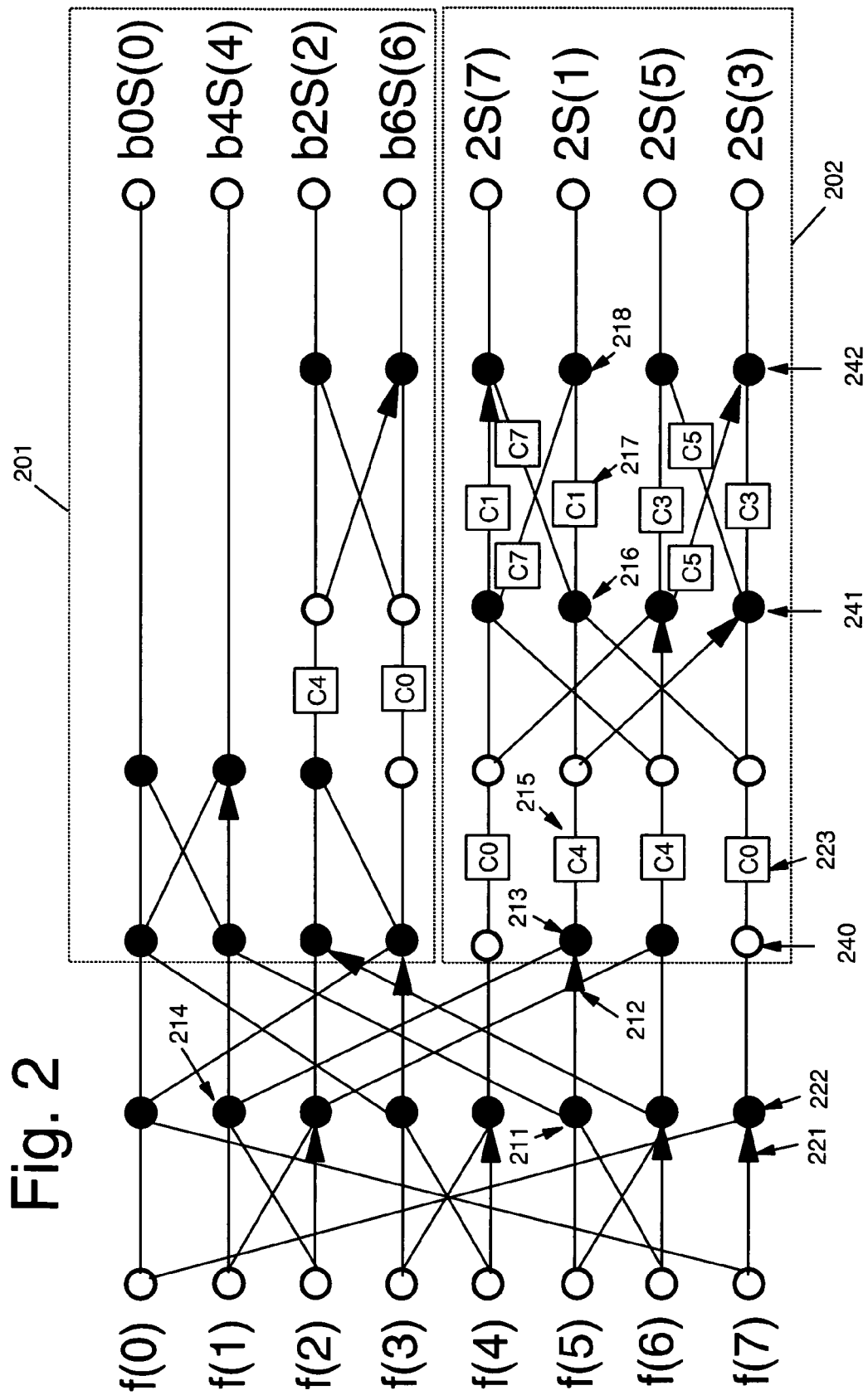
FIG. 2 is a flow-graph of a combined "Arai, Agui, and Nakajima" and "Vetterli and Ligtenberg" fast 1-D FDCT.

In the preferred embodiment of the present invention a one-dimensional Forward Discrete Cosine Transform (1-D FDCT) is used which is based on two prior art FDCT algorithms and this is illustrated by a flow-graph in FIG. 2. Note that in a flow-graph of this type the logic flow is from left to right, a dark circle (e.g.: 222) represents an addition operation, an arrow (e.g.: 221) indicates negation of a value, and boxes (e.g.: 223) indicate a multiplication by the Cn constant shown in the box, where $Cn=Cos(n\pi/16)$.

For example, following the flow from f(5) to 2S(1), f(5) and f(6) are added at dark circle 211, and then negated by arrow 212. f(1) and f(2) are then added at dark circle 213 (these having been added at dark circle 214), and the result is multiplied by C4 at box 215. This gives $C_4(s_{12}-s_{56})$, where in general, f(x)+f(y) is denoted $s_{xy}$. At dark circle 216 f(0)-f(7) is added, f(7) having been negated by arrow 221 and f(0) added at dark circle 222, and the result multiplied by C0 at box 223, although note that C0 is equal to 1. This gives $C0d_{07}+C_4(s_{12}-s_{56})$, where in general f(x)−f(y) is denoted $d_{xy}$, which is then multiplied by C1 at box 217 giving $C1[C0d_{07}+C_4(s_{12}-s_{56})]$. Finally at dark circle 218, the sum $C7[C0d_{34}+C_4(d_{12}+d_{56})]$ is added, and this may be derived by following a process such as described above but by following the line from f(4). Accordingly the equation which the flow-graph represents for S(1) is:

$$2S(1)=C1[C0d_{07}+C4(s_{12}-s_{56})]+C7[C0d_{34}+C4(d_{12}+d_{56})]$$

In the DCT of FIG. 2, after the first two butterflies (sum and difference) stages which end at the column of nodes of which nodes 213 and 240 are a part, the flows for the even DCT coefficients (S(0), S(2), S(4), and S(6)) are separated out from those of the odd DCT coefficients (S(1), S(3), S(5), and S(7)). The odd coefficients are then processed according to the Arai, AGui, and Nakajima 1-D FDCT as shown within box 202 and the even coefficient are processed according to the Vertterli and Ligtenberg 1-D FDCT as shown within box 201.

However, if the FDCT equations illustrated by the flow diagram of FIG. 2 were used as a set of transform equations the inclusion of the floating point constants Cn would result in many expensive floating point multiplications. Accordingly, in the prior art, these values are replaced with approximations which result in the floating point multiplication being replaced with integer multiplications.

For example in U.S. Pat. No. 6,766,341, the constants in a given equation are replaced with approximations comprising integer numerators and a common integer denominator, and in co-pending and commonly-assigned patent application "Reducing errors in performance sensitive transformations" to Hinds et al., having application Ser. No. 10/960,253, the constants are replaced with approximations comprising integer numerators and a common floating point denominator. Further, in this prior art common denominators are used for each equation because this enables the transform to be performed with the integer numerators only, and the denominators to be factored in at a later stage. Further in co-pending and commonly-assigned patent application "Approximations used in performance sensitive transformations which contain sub-transforms" to Mitchell et al., having application Ser. No.: 11/041,563 the common denominators are only required to be common for the sub-transforms of an equation. This means that not all approximations for an equation need to use the same common denominator and as a result more accurate approximations are possible.

Accordingly in the preferred embodiment of the present invention the Cn constants are replaced with approximations on a per sub-transform basis and which comprise an integer numerator and a floating point denominator as follows:

| Constant | Integer Numerator | Denominator |
|----------|-------------------|-------------------|
| C0 | 17 | 16.9852813742385607 |
| C1 | 5 | 5.1118933432623006 |
| C3 | 3 | 3.6039871070779674 |
| C4 | 12 | 16.9852813742385607 |
| C5 | 2 | 3.6039871070779674 |
| C7 | 1 | 5.1118933432623006 |

Note that the denominators are chosen such that their use in calculating the result of a transform equation may be deferred to a final calculation, and as a result the transform equations can be performed with the integer numerators in place of the constants.

Further, in the preferred embodiment of the present invention the multiplication of a value by an integer numerator, during the evaluation of an equation, are implemented using shifts right. This is done to control the growth of the values resulting from the multiplication. The following table shows the number of bits shifted to the right when implementing multiplication by the integer numerator and the effective multiplication which results from the shift:

| Constant | Numerator | Number of bits shifted | Effective multiplication |
|----------|-----------|------------------------|--------------------------|
| C0 | 17 | 4 | $17/16$ |
| C1 | 5 | 2 | $5/4$ |
| C3 | 3 | 1 | $3/2$ |
| C4 | 12 | 4 | $3/4$ |
| C5 | 2 | 1 | 1 |
| C7 | 1 | 2 | $1/4$ |

Figure 3A:
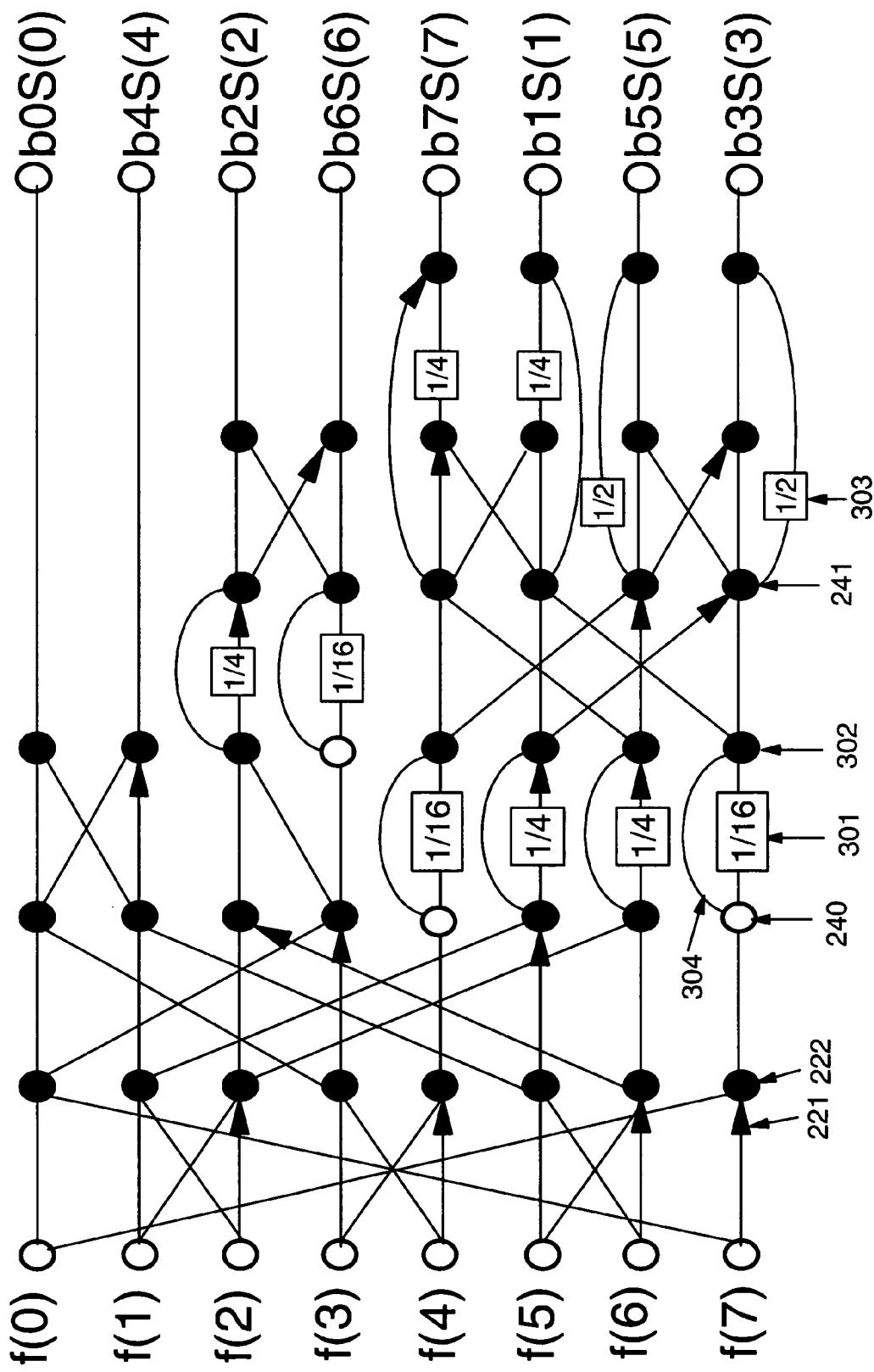
FIG. 3a is the flow-graph of FIG. 2 implemented using integer approximations and shifts right.

Accordingly FIG. 3a shows the flow-graph of FIG. 2 re-drawn to show replacement of the constants with the integer numerators of their approximations which are implemented as shift rights and accordingly in this figure all multiplications are implemented as shift rights. For example, the approximation of C0 is replaced from node 240 with a flow to a $1/16$ multiplier box 301, and a new flow 304 which is effectively a multiplication by 1. The result of these two flows is then added at node 302, thus implementing C0 as $1+1/16$ where the $1/16$ is implemented as a shift right by 4 places. This effectively replaces the integer approximation of 17 by 17/16. Similarly, in the diagram, C4 has been replaced with $1-1/4$ which is $3/4$, C1 with $1+1/4$ which is $5/4$, C3 with $1+1/2$ which is $3/2$, C5 with 1, and C7 with $1/4$.

Further in this figure the results at the right of the flow have been changed to be bnS(n), for example b3S(3). The bn values are known as scale factors and represent the modifications that must be made to the result of an equation in order to allow for the use of approximations when performing the equations. For example the modification may involve dividing the result by the denominators of the approximations used and further to compensate for the shift right used to implement the numerators.

However, in performing the equation using shift rights, truncation errors may be introduced depending on the low order bits of the values being shifted. For example at box 301 the value of f(0)-f(7) is shifted 4 bits to the right thus dropping the low order 4 bits of the value, this corresponding to truncating everything after the decimal point when dividing by 16. Accordingly, for example, if the low order 4 bits of the value of f(0)-f(7) were "0", dropping of these bits would have no effect on the result, whereas if each of the low order 4 bits were "1", dropping these bits would result in a truncation amount of $15/16$. Thus the truncation amount will depend both on the number of bits to the right a value is shifted and on the content of the low order bits of the value which will be dropped as a result of the shift.

The following table shows the possible truncation amounts for a shift to the right of N bits, depending on the value of the low order N bits of the value being shifted:

| Low order N bits | Amount Truncated (Shift Right N) |
|------------------|----------------------------------|
| 00 ... 00 | $0/2^{**}N$ |
| 00 ... 01 | $1/2^{**}N$ |
| 00 ... 10 | $2/2^{**}N$ |
| ... | $.../2^{**}N$ |
| 11 ... 10 | $(2^{}N) - 2/2^{}N$ |
| 11 ... 11 | $(2^{}N) - 1/2^{}N$ |

From this table it can be seen that for a shift to the right of N bits, the sum of all of the truncation amounts for each of the possible low order bit patterns can be calculated as $2^{}N/2$ pairs whose sum is $((2^{}N)-1)/2^{}N$. Therefore the total sum of the possible truncation amounts is $(2^{}N/2)^*((2^{}N)-1)/2^{}N$, and the average truncation amount, assuming each low order bit pattern has an equal probability of occurring, is this value divided by $2^{**}N$. Accordingly the average truncation amounts can be written:

Average truncation amount=$((2^{}N)-1)/2^{}(N+1)$

Based on this calculation the following table now shows the average truncation amount for shift to the right from 1 to 5 bits (i.e.: N=1 to 5):

| N | $1/2^{**}N$ | Range of Truncated Values | Average Truncation |
|---|---|---|---|
| 1 | 1/2 | 0, 1/2 | 1/4 |
| 2 | 1/4 | 0, 1/4, 1/2, 3/4 | 3/8 |
| 3 | 1/8 | 0, 1/8, . . . , 7/8 | 7/16 |
| 4 | 1/16 | 0, 1/16, . . . , 15/16 | 15/32 |
| 5 | 1/32 | 0, 1/32, . . . , 31/32 | 31/64 |
| . . . | . . . | . . . | . . . |
| N | $1/2^{}N$ | 0, $1/2^{}N$, . . . , $((2^{}N)-1)/2^{}N$ | $((2^{}N)-1)/2^{}(N+1)$ |

Note that for large N the average truncation amount approaches 1/2.

From this table it is possible to calculate the average truncation amount introduced in an equation of the 1-D FDCT of the preferred embodiment of the present invention and this is shown in FIG. 3b. For example, when looking at the bottom flow from f(7) to S(3) in FIG. 3b, as a result of the multiplication by 1/16 at box 301 an average truncation amount of −15/32 (311) is introduced, that is the value at the node immediately after the multiplication by 1/16 will be, on average, 15/32 smaller than its value had truncation not occurred. At the next node a value from the S(1) line which has an average truncation amount of +3/8 is subtracted, this introducing an average truncation amount of −3/8, giving a total average truncation amount of −27/32 (312). At the next node a value from the S(5) line which has an average truncation amount of −27/32 is subtracted, this introducing an average truncation amount of +27/32 which when added to the current average truncation amount of −27/32 leaves an average truncation amount of 0 (313). Therefore to this point all previous average truncation amounts have cancelled each other out, or in other words, if each shift right performed to this point in the flow introduces the average truncation amount associated with the shift, no truncation amount will be present in the value at this point. However at the final addition node for this flow a value is added which at the previous node had an average truncation amount of −27/32 and which was then shifted 1 bit to the right as a result of multiplier box 303. The shift right by 1 introduces an average truncation amount of −1/4 and further shifts the existing truncation amount such that it is halved to −27/64, thus giving a total average truncation amount of −43/64. That is to say, by implementing the integer approximations using shift rights, if each of the shift rights performed in calculating a value for b3S(3) each resulted in the average truncation amount associated with the shift, the resultant cumulative truncation amount in the value resulting from the flow would be −43/64.

Figure 4A:
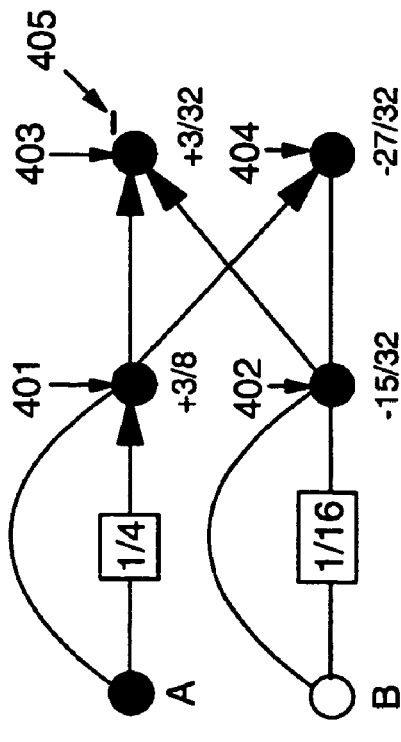
FIGS. 4a-4c illustrate possible flow variations for a C0/C4 rotation.
Figure 4B:
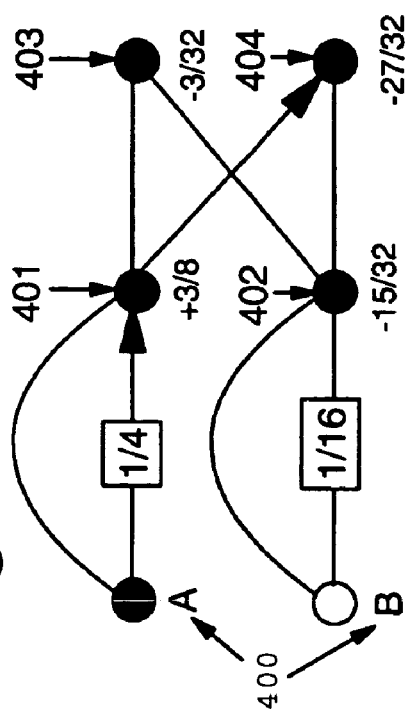
Figure 4C:
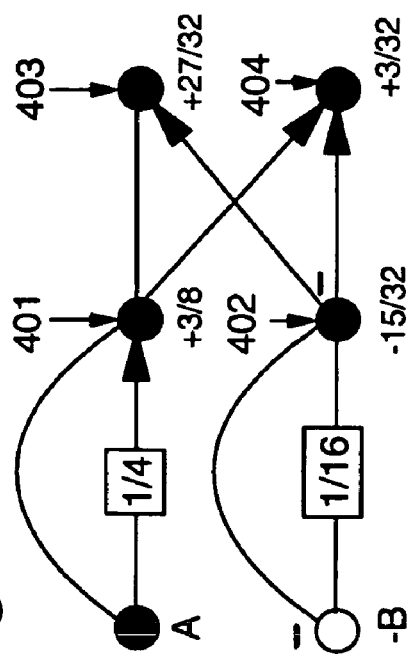

However, the inventors have realized that the DCT algorithm can be modified to change the average truncation amount produced at some nodes and increase the likelihood of actual truncation amounts canceling each other out. For example, this is shown in FIGS. 4a-4c for a sub-transform of the 1-D DCT of the preferred embodiment which, referring to FIG. 2, occurs on the S(1) and S(3) lines between the columns of nodes of which nodes 240 and 241 are a part. This sub-transform is known as the C4/C0 rotation. Given inputs A and B (400) the purpose of the sub-transform is to produce the result of (3A/4+17B/16) at node 403 for the top flow, and (17B/16−3A/4) at node 404 for the bottom flow, although either result could be negated if such negation is compensated in subsequent processing. However, the sub-transform involves a shift right of 2 bits in the top flow and this introduces a truncation amount for which the average is +3/8 at node 401. Further the sub-transform involves a shift right of 4 bits in the bottom flow and this introduces an average truncation amount of −15/32 at node 402. The values at nodes 401 and 402 are then combined to produce a result at nodes 403 and 404 and this has the effect that the truncation amounts are combined to produce a total average truncation amount for each flow of the sub-transform. FIGS. 4b to 4c show examples of different flows for which the results at nodes 401 and 402 can be combined to produce the same result but with different total average truncation amounts.

In FIG. 4a the sub-transform is shown in the same for as in FIG. 3a, that is for the top row the values at 401 and 402 are summed and for the bottom flow the value at 401 is subtracted from the value at 402. This has the effect that at node 403 the truncation amounts are combined and at node 404 the truncation amount from node 401 is subtracted from that of node 402. Accordingly the total of the average truncation amounts at node 403 and 404 are −3/32 and −27/32, respectively.

In FIG. 4b, for the top flow the result at node 403 is obtained by negating both flows from nodes 401 and 402. When compared to FIG. 4a, this has the effect of changing the total average truncation amount from −3/32 to +3/32 and negating the output value to −(3A/4+17B/16), as shown by − sign 405. For the bottom row the flows are the same as for FIG. 4a. This shows that the sign of the average truncation amount at a node can be changed by reversing the sign of the input flows to the node, although this also has the effect of negating the value of the node. With reference to FIG. 4a this technique can also be applied to either the top flow to node 403 (as in FIG. 4b) or the bottom flow to node 404, or to both nodes, thus making it possible to produce average truncation amounts of +/−3/32 at node 403 and +/−27/32 at node 404. Note that in the figures the presence of a negated version of the value required at a node is denoted by a "−" sign, such as 405, adjacent to the node.

In FIG. 4c, the sign of the input value B to the transform is negated. This does not affect the sign of the average truncation amounts introduced at nodes 401 and 402 but changes the way the values at 401 and 402 must be combined to produce the required results at nodes 403 and 404. Accordingly to produce the correct result at node 403 the value at node 402 is subtracted from the value at node 401, and to produce the correct result at node 404 the values at nodes 401 and 402 are negated and summed. This change in flow also changes the way in which the average truncation amounts are combined to give a total average truncation amount of 27/32 at node 403 and 3/32 at node 404. This shows that by producing a negated result at node 402, the total average truncation amounts at node 403 and 404 are reversed. Alternatively a negated value at node 402 could be achieved, if input B is not negated, by changing the signs of the input flows to node 402. Further, the same effect can be achieved by alternatively negating the value at node 401 (instead of the value at node 402) either by negating input A or changing the signs of the input flows to node 401. Accordingly FIG. 4c shows that, in combination with the teachings of FIG. 4a, it is possible to produce average truncation amounts of +/−27/32 at node 403 and +/−3/32 at node 404.

Accordingly it has been shown that a sub-transform in the DCT can modified to change the total truncation amounts produced by each flow of the sub-transform and a skilled person will realize that, with reference to FIGS. 4a-4c, that other modifications of the transform are possible to produce any combination of +/−3/32 at the node 403 and +/−27/32 at node 404 or vice-versa. For example either or both inputs may be negated and further flows can be changed to produce a negative result at any of the nodes 401, 402, 403, and 404.

Note that other sub-transforms can also be identified in FIG. 3a. For example a transform the same as that of FIG. 4a can be seen on the flows from f(2) and f(3) to S(2) and S(6) and further a similar sub-transform which produces slightly different results can be seen between the columns of nodes of which nodes 240 and 241 form a part and on the flows between f(4) and f(6) to S(7) and S(5).

Figure 5A:
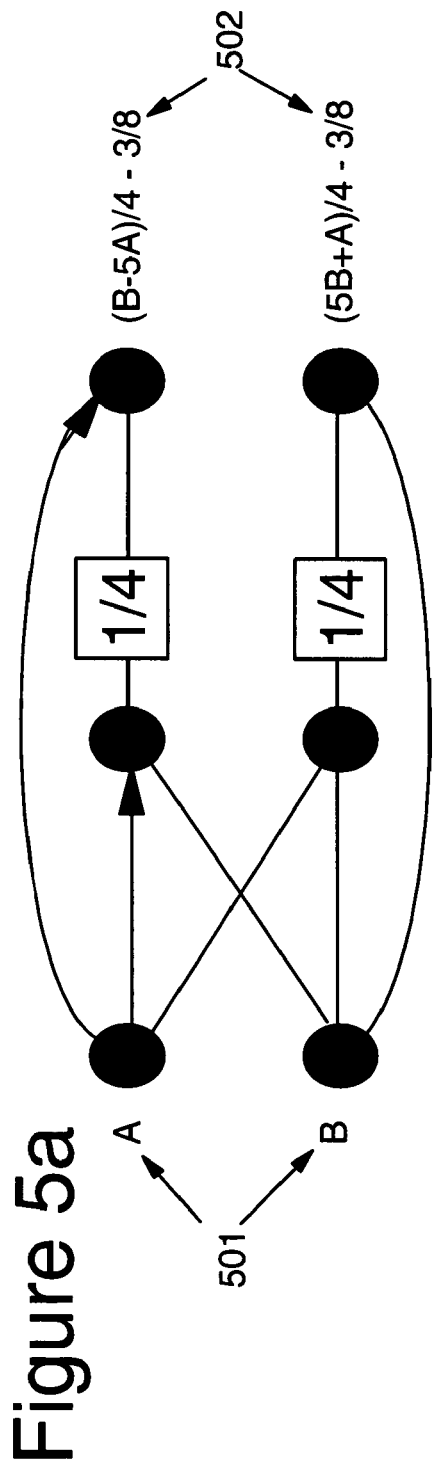
Figure 5B:
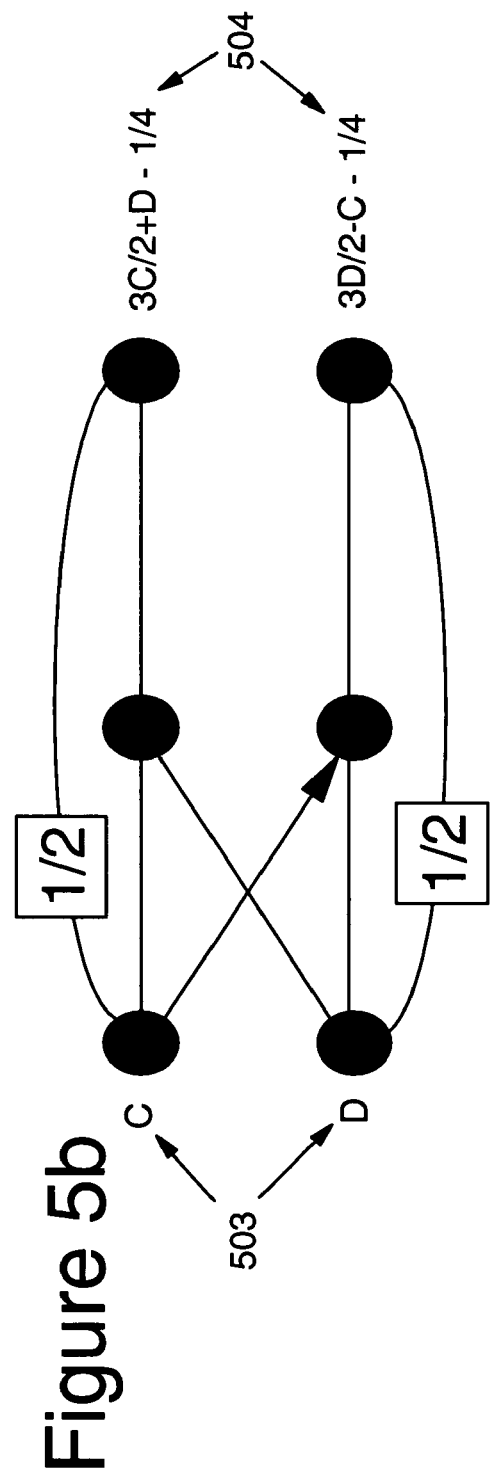

Further two other sub-transforms can be identified to the right side of the bottom 4 flows of FIG. 3a. Each of these transforms also include shifts right and as a result also introduce average truncation amounts and this is shown in FIGS. 5a and 5b In FIG. 5a the inputs 501 are shown as A and B, although these are not the same A and B as in FIGS. 4a-4c. The purpose of the inputs and +/−27/32 for the other two inputs. For example with the top flow of FIG. 5b, if the inputs C and D contain average truncation amounts, the average truncation amount present in the result can be evaluated from 3C/2+D−1/4, with C and D being replaced by the average truncation amounts present in them. Accordingly, for this flow, if an average truncation amount of 27/32 is present in inputs C and D the average truncation amount present in the result will be (3/2)*(27/32)+27/32−1/4=119/64.

With this in mind it is possible to draw a table of all possible total average truncation amounts for the sub-transforms of FIGS. 5a and 5b for a given average truncation amount in the inputs. For example, the table below shows the possible total average truncation amounts if the average truncation amount present in inputs A and B (501) is |3/32| and in inputs C and D (503) is |27/32|. The table shows, for the four possible outputs from the sub-transforms (shown in row 1), eight possible values of total average truncation amount depending on the sign of the truncation amount present in A and B or C and D (as shown in two left most columns of the table), and further depending on whether the average truncation amount introduced by the sub-transform is positive or negative (as shown in row 2 of the table).

|   |   | (B − 5A)/4 | | (5B + A)/4 | | 3C/2 + D | | 3D/2 − C | |
|---|---|---|---|---|---|---|---|---|---|
|   |   | +3/8 | −3/8 | +3/8 | −3/8 | +1/4 | −1/4 | +1/4 | −1/4 |
| + | + | 18/64 | −30/64 | 33/64 | −15/64 | 151/64 | 119/64 | 43/64 | 11/64 |
| + | − | 15/64 | −33/64 | 18/64 | −30/64 | 43/64 | 11/64 | −119/64 | −151/64 |
| − | + | 33/64 | −15/64 | 30/64 | −18/64 | −11/64 | −43/64 | 151/64 | 119/64 |
| − | − | 30/64 | −18/64 | 15/64 | −33/64 | −119/64 | −151/64 | −11/64 | −43/64 | of this sub-transform is to produce 2 results of (B−5A)/4 and (5B+A)/4. However, because a shift right by 2 bit positions is present in both flows, these shifts introduce an average truncation amount of −3/8 in both results 502.

In FIG. 5b the inputs 503 are shown as C and D. The purpose of this sub-transform is to produce 2 results of 3C/2+D and 3D/2−C. However, because a shift right by 2 bit positions is present in both flows, these shifts introduce an average truncation amount of −1/4 in the final results 504.

Further, a skilled person will realize the flows of sub-transforms of FIGS. 5a and 5b can be modified to produce the same results but with different average truncation amounts, according to the teaching of FIGS. 4a-4c. For example, with reference to FIG. 5a, if the sign of each of the inputs to the final nodes were changed the result would be negated and the truncation amount made positive. Accordingly the flows which produce each of the results 503,504 of FIGS. 5a and 5b can be individually modified to produce either a positive or negative average truncation amount.

Further, note that both of these sub-transforms receive inputs which are outputs of an earlier sub-transform in the flow and which are of the type described with reference to FIGS. 4a-4c. As a result the inputs will have associated average truncation amounts and this will affect the total average truncation amount in outputs of the sub-transforms. Further, when considered together, the average truncation amount present in these inputs (A, B, C, D) can be +/−3/32 for any two From this table it can be seen, with reference to FIG. 3b, that the final truncation amounts in the bottom four flows of the flow graph match the highlighted values in the bottom row of the table. This is because the input average truncation amount to each flow of the sub-transform is positive (i.e.: −3/32 and −27/32, corresponding to the bottom row of the table) and further the flows of the sub-transforms introduce negative average truncation amounts (i.e.: −3/8 and −1/4, corresponding to the right column in the table for each sub-transform). Further from this table it can be seen, for this set-up of input truncation amount (ie: |3/32| for A and B and |27/32| for C and D), the least average truncation amount can be obtained, for example, by reconfiguring the sub-transforms of FIGS. 4b, 5a, and 5b to introduce positive truncation amounts on each of their flows, this producing average truncation amounts of average truncation amount can be obtained, for example, by reconfiguring the sub-transforms of FIGS. 4b, 5a, and 5b to introduce positive truncation amounts on each of their flows, this producing average truncation amounts of −18/64, 15/64, −119/64 and 11/64 for the four results reading left to right in the table, respectively (i.e: from row 4 of the table).

A skilled person will realize that similar tables could be drawn for each possible combination of average truncation amount present in the inputs A, B, C and D. For example the similar table for an input average truncation amount of |27/32| in inputs A and B and |3/32| for inputs C and D is as follows:

|   |   | (B − 5A)/4 | | (5B + A)/4 | | 3C/2 + D | | 3D/2 − C | |
|---|---|---|---|---|---|---|---|---|---|
|   |   | +3/8 | −3/8 | +3/8 | −3/8 | +1/4 | −1/4 | +1/4 | −1/4 |
| + | + | −30/64 | −78/64 | 105/64 | 57/64 | 31/64 | −1/64 | 19/64 | −13/64 |
| + | − | −57/64 | −105/64 | −30/64 | −78/64 | 19/64 | −13/64 | 1/64 | −31/64 |
| − | + | 105/64 | 57/64 | 78/64 | 30/64 | 13/64 | −19/64 | 31/64 | −1/64 |
| − | − | 78/64 | 30/64 | −57/64 | −105/64 | 1/64 | −31/64 | 13/64 | −19/64 |

From this table it is possible to identify several possible combinations of the signs of the input truncations and new truncations introduced, which provide the least total average truncation amount when considering the four outputs together. For example the highlighted values indicate one such possible combination. With regard to the sub-transform of FIG. 5a, this combination requires an input average truncation amount of −27/32 associated with input A and +27/32 associated with input B, and with regard to the sub-transform of FIG. 5b, this combination requires an input average truncation amount of +3/32 associated with input C and +3/32 associated with input D.

It should be noted that the previous two tables of tables of average truncation assume that each flow of the sub-transform produces a result of the correct sign. However, for example, the top flow of FIG. 5a could be modified to

|   |   | −(B − 5A)/4 | |
|---|---|---|---|
|   |   | +3/8 | −3/8 |
| + | + | 30/64 | −18/64 |
| + | − | 33/64 | −15/64 |
| − | + | 15/64 | −33/64 |
| − | − | 18/64 | −30/64 |

This effectively swaps the columns of average truncation amounts and reverses the sign of each average truncation amount, and this could be applied to any pair of columns of the tables.

Accordingly, if all possible tables were drawn based on inputs A,B, C and D set to a combination of values comprising 3/32, 3/32, 27/32 and 27/32, it is possible to determine the minimum possible total average truncation amount for the sub-transforms of FIGS. 5a and 5b, and this is shown in the following table in which all total average truncation amounts are shown as positive numbers in units of 1/64:

| A | B | C | D | (B − 5A)/4 & (5B + A)/4 | 3C/2 + D & 3D/2 − C |
|---|---|---|---|---|---|
| 6 | 6 | 54 | 54 | 15 & 18\|18 & 15 | 11 & 119\|119 & 11 |
| 6 | 54 | 6 | 54 | 3 & 42 | 29 & 71\|47 & 59 |
| 6 | 54 | 54 | 6 | 3 & 42 | 71 & 29\|59 & 47 |
| 54 | 6 | 6 | 54 | 42 & 3 | 29 & 71\|47 & 59 |
| 54 | 6 | 54 | 6 | 42 & 3 | 71 & 29\|59 & 47 |
| 54 | 54 | 6 | 6 | 30 & 57\|57 & 30 | 1 & 13\|13 & 1 |

In the table, where more than one option is available for a sub-transform these are separated by a |.

Figure 6:
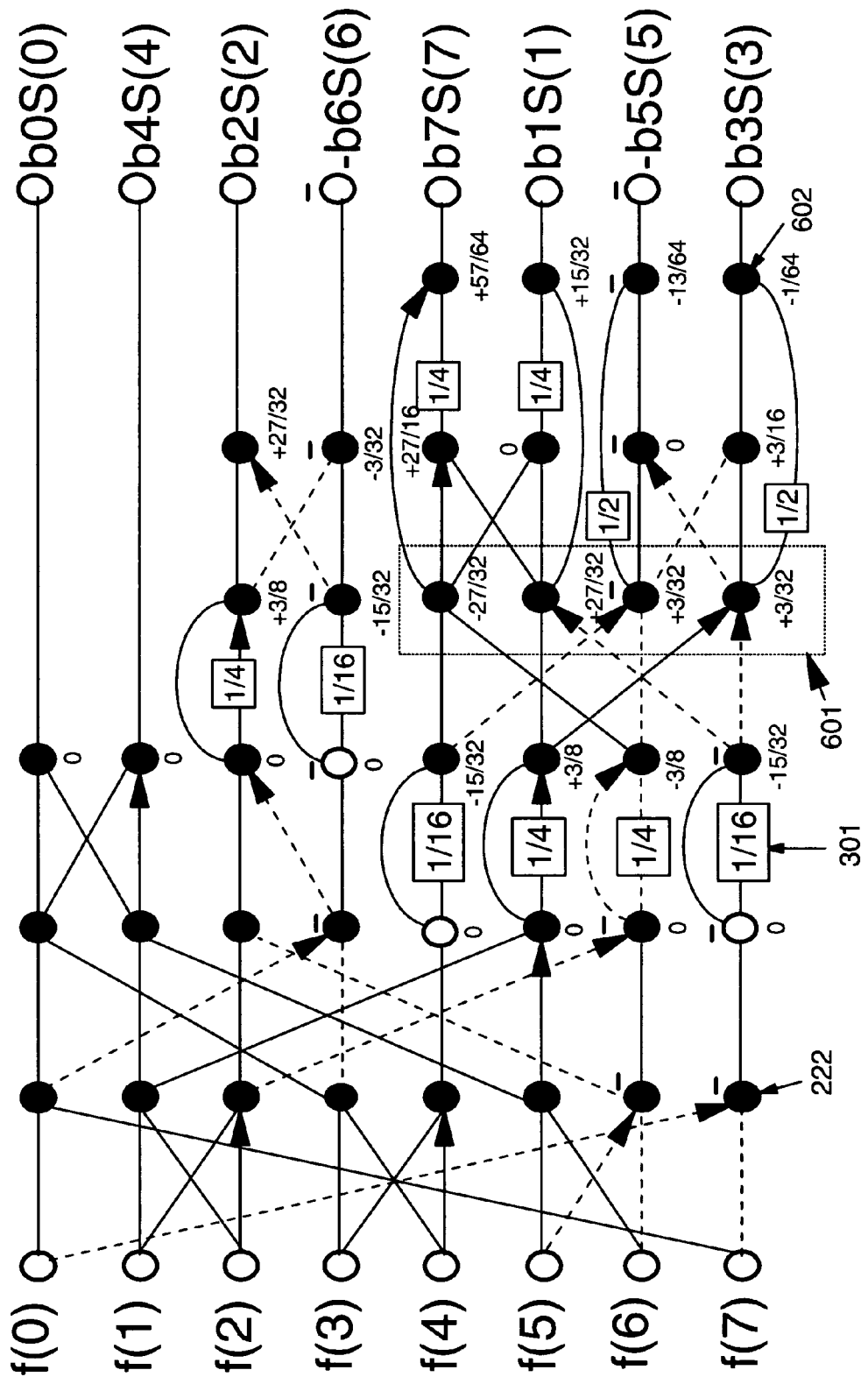
FIG. 6 is the flow-graph of FIG. 3a modified to compensate for average truncation errors.

After taking account of the above findings, in the preferred embodiment of the present invention the 1-D FDCT of FIGS. 3a and 3b was modified to reduce the total average truncation amount to a minimum based on the bottom row of the above table and this is shown in FIG. 6. In this figure the flows which have been changed compared to FIGS. 3a and 3b are shown as dashed lines. In this embodiment it can be seen that, as indicated by box 601, the changes set up the average truncation amount present in the inputs to the sub-transform of FIG. 5a to be −27/32 and +27/32 and to the sub-transform of FIG. 5b to be +3/32 and +3/32. Further the input to the S(5) flow of the sub-transform of FIG. 5b (top flow) is negated and as a result its flows are modified to allow for this. From these changes it can be seen that the final total average truncation amount present in the results for S(7), S(1), S(5) and S(3) are 57/64, 15/32, −13/64, and −1/64 respectively, and this represents a significant improvement over the equivalent total average truncation amount present in FIG. 3b.

Further it should be noted that the results of the flows comprise the S(n) value multiplied by a scale factor bn, and as a result truncation amount present in the final result may be divided by the scale factors bn if it is desired to obtain the S(n) values. For example, for the preferred embodiment of the present invention the scale factors are b1=b7=2.706, b3=b5=3.825, which means that, roughly speaking truncation amounts on the S(1) and S(7) flows are more 1.5 times more heavily weighted than those on the S(3) and S(5) flows. As a result, one unfortunate side effect of the flow in FIG. 5 is that the total average truncation amounts are higher in the flows which have a smaller scale factor and accordingly the effect of the final average truncation amount on the result for S7, when including the scaling factor is (57/64)/2.706=0.329. Further it should be noted that a scale factor can be negative in order to compensate for a negated result. For example this can be seen in FIG. 6 in which the scaling factors for S(6) and S(5) are −b6 and −b5, respectively.

Figure 7:
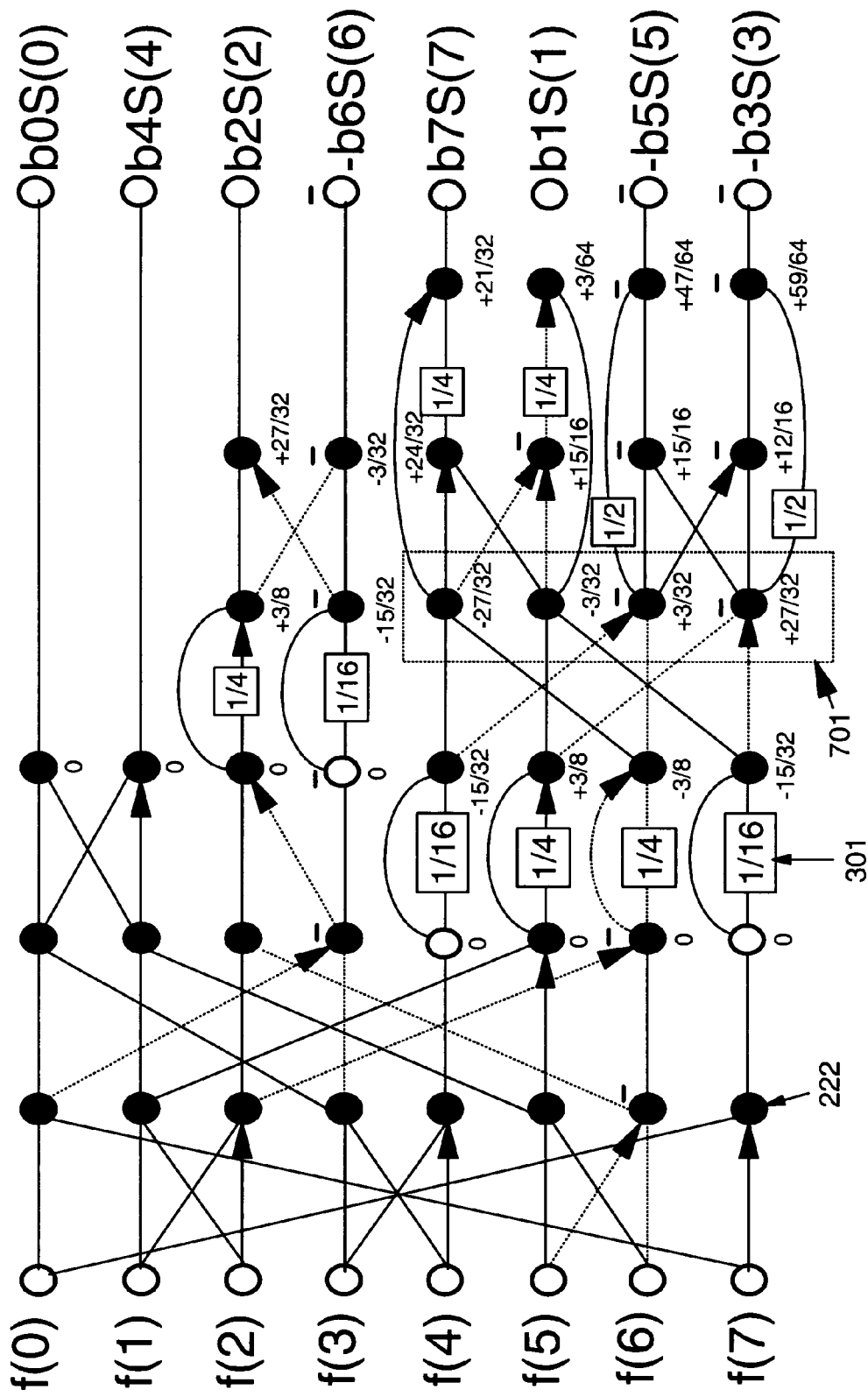
FIG. 7 is an alternative modification of the flow-graph of FIG. 3a to compensate for average truncation errors.

Accordingly, in an alternative embodiment the 1-D DCT of FIGS. 3a and 3b is modified as shown in FIG. 7. Whilst this modification in general increases the average truncation amount values associated with the S(1), S(3), S(5) and S(7) flows, it also reduces the highest total average truncation amount. It can be seen in this embodiment that, as indicated by box 701, the changes set up the average truncation amount present in the inputs to the sub-transforms of FIGS. 5a and 5b to be −27/32 and −3/32, and 3/32 and 27/32, respectively. The result of this is that the total average truncation amount present in the results for S(7), S(1), S(5) and S(3) are 42/64, 3/64, 47/64, and 59/64 respectively. For this embodiment, when comparing with the embodiment described with reference to FIG. 6, this has the affect that the highest total average truncation amount is still associated with S(7) but, when allowing for the scaling factor it is reduced from 0.329 to 0.243.

Further, in the preferred embodiment of the present invention, the total average truncation amount calculated to be present in the result is used in a rounding step which is used to round the results of the transform equations to an integer value. Rounding usually comprises adding a rounding value of 0.5 to the result and then truncating. However in the preferred embodiment of the present invention the rounding value is set to 0.5 minus a correction value, where the correction value is the total average truncation amount. However, a limit to the size of this amount may be optionally applied. For example, if the transform equations are being used to process JPEG image data each result of the equation is quantized according to a quantization value in order to reduce its value and therefore compress the image data. For example, for a given result and a quantization value, Q, the quantized result can be calculated as (result +rounding value +0.5Q)/Q. In this case it is desirable that the rounding value does not change a quantization value of the result by more than one quantization value, because this could move a result with no actual truncation amount by two quantization values. This can be achieved by limiting the rounding value to be no more than Q. Further, the best compression is obtained if results have a quantized value of zero and as a result it is desirable that the rounding step does not move a result with zero actual truncation amount from a quantized value of 0.

Note that a skilled person will realize that, with reference to FIGS. 6 and 7, there are many modifications to the flows which could be made whilst maintaining the same equivalent error. For example with reference to FIG. 6, the inputs to node 602 could be negated, this producing a truncation amount of +1/64 and a negative result (−b3S(3)).

Further a skilled person will realize that many modifications are possible to the flows of FIGS. 3a and 3b which will reduce the total average truncation amount associated with the results, but provide different total average truncation amounts to the embodiment of FIGS. 6 and 7. Further a skilled person will realize that the techniques of the present invention could be applied to any transform in order to reduce the average truncation amount.

Figure 8:
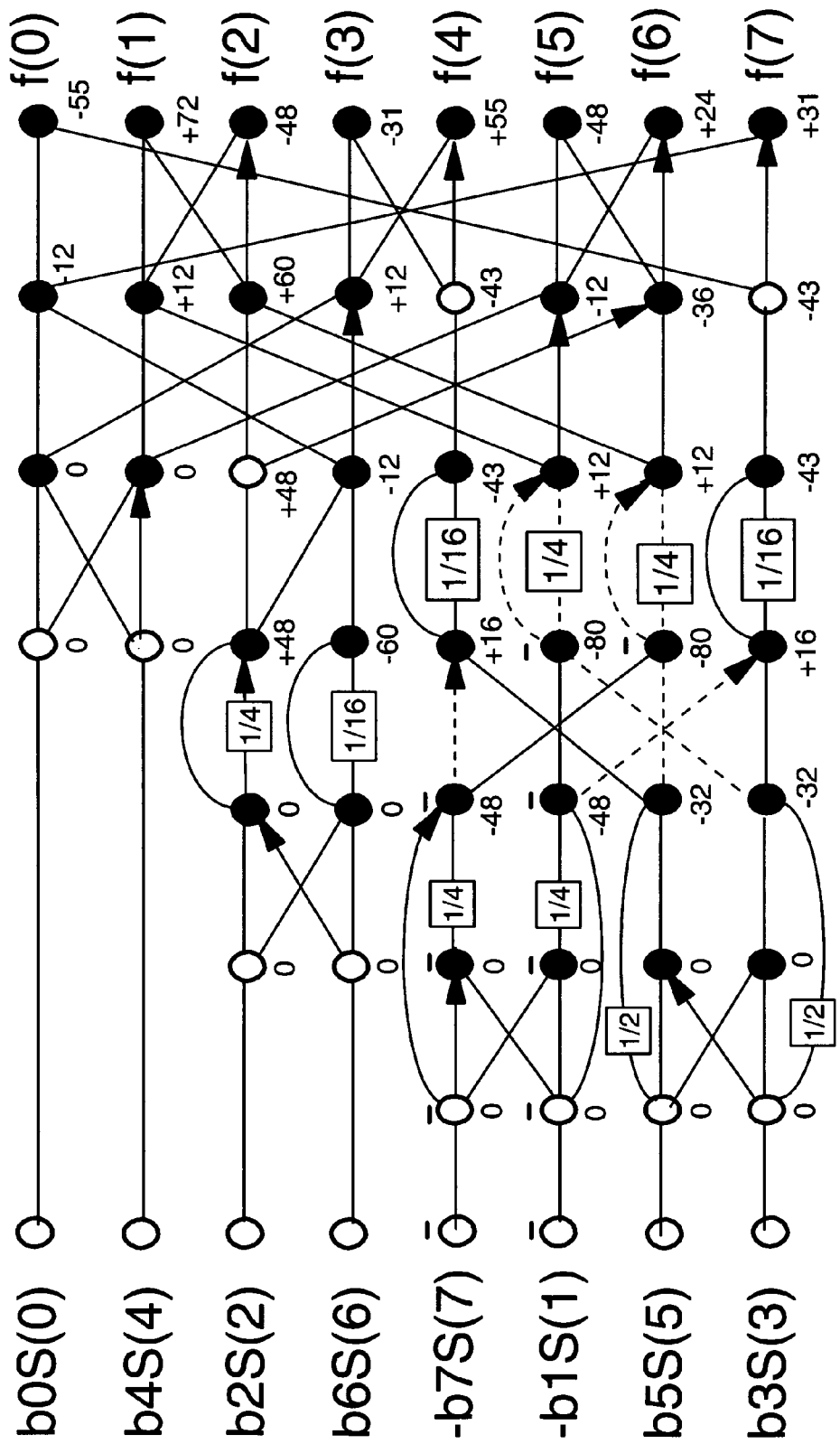
FIG. 8 is a flow-graph of the Inverse DCT for the FDCT of FIG. 3a modified to compensate for truncation errors and with truncation amounts shown in units of $1/128$.

Further a skilled person will realize that the present invention can also be applied to an Inverse transform such as an inverse DCT (IDCT). FIG. 8 shows an IDCT for the FDCT of FIG. 3a, but modified according to the present invention in order to reduce the truncation error present in the final results. In this figure the average truncation amount present at each node is shown just underneath the node in units of 1/128ths. Further the flows which are shown as dashed lines are those which have been changed compared to the standard IDCT for the FDCT of FIG. 3a. Note that FIG. 8 makes no assumption as to the truncation error present in the inputs bnS(n). However if, for example an FDCT such as that shown in FIG. 6 was used to create the input data, an average truncation amount will be associated with each input and as a result the flows may be further modified to allow for this.

Note that the preferred embodiment is considered in terms of average truncation amount based on all possible bit values of the values on which the relevant operation is performed having an equal probability of occurring. However, this may be considered more generally as a pre-determined truncation amount assigned to each shift right which is calculated as the average truncation amount. As such, the pre-determined truncation amounts could be determined according to many algorithms. For example an average can be calculated based on the probability of all possible bits occurring being of an alternative distribution, for example as could be determined using empirical data. Further such an average could be a mean, mode (most frequent) or median. Alternatively, for example, the pre-determined truncation amounts could be determined based on a maximum truncation amount which may be introduced by the operation with which they are associated. Accordingly if a correction term is used to compensate for truncation error in the result of a transform, this can be based on the total cumulative pre-determined truncation error present in the result.

Figure 9:
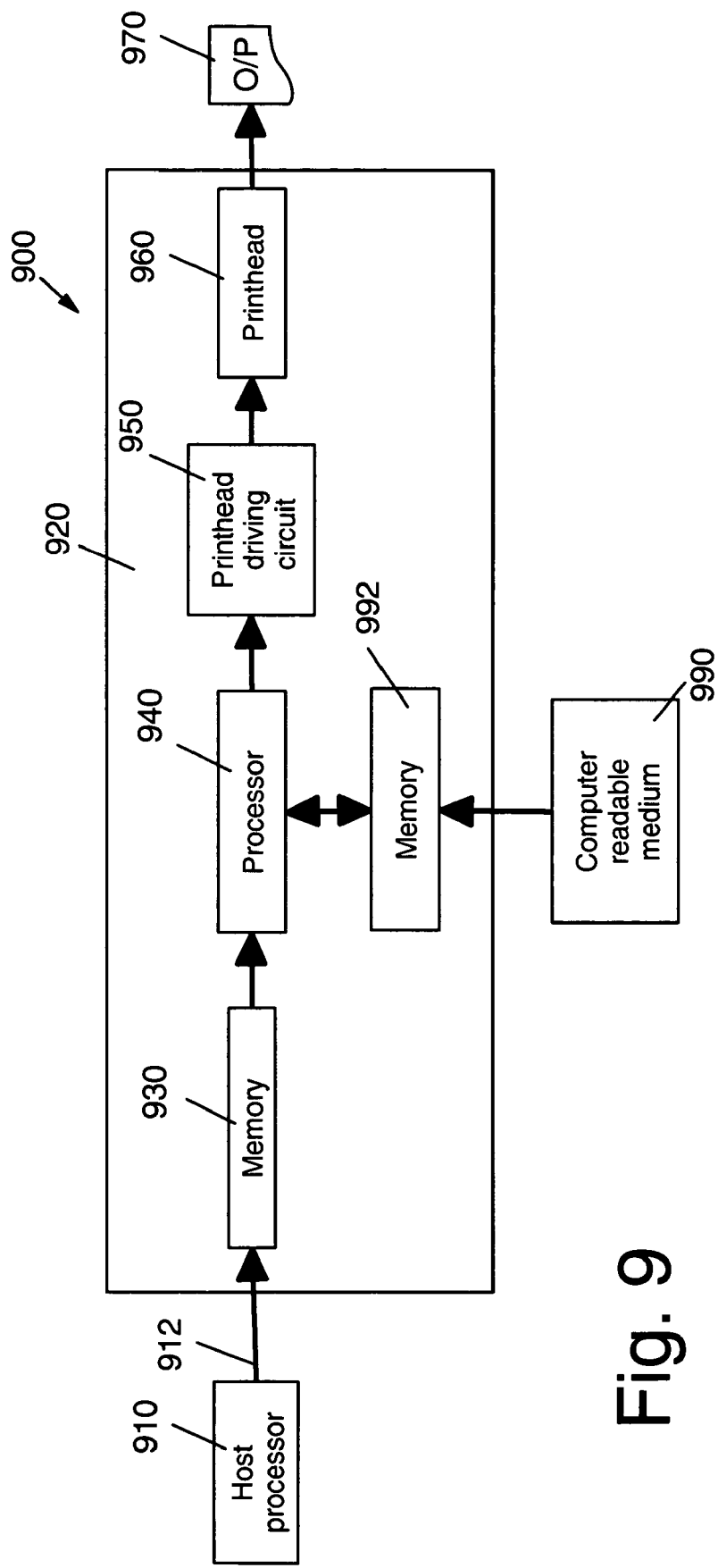
FIG. 9 is a block diagram of a printer according to the preferred embodiment of the present invention.

FIG. 9 illustrates a block diagram 900 of a printer 910 according to the present invention. In FIG. 9, the printer 920 receives image data 912 from a host processor 910. The image data 912 is provided into memory 930 where the image data may be arranged into 8×8 block samples. The 8×8 block samples are then processed by a processor 940, such as a raster image processor. The raster image processor 940 provides a compressed print stream representing the image data to a printhead driving circuit 950. The printhead driving circuit 950 then controls the printhead 960 to generate a printout 970 of the image data. Note that the printhead driving circuits 970 will include a decoder function for decoding the compressed print stream, thus allowing more pages to be stored ready for printing.

For example an IDCT which compensates for truncation error, such as the IDCT illustrated in FIG. 8 may be tangibly embodied in a computer-readable medium/carrier 990, e.g. one or more of the fixed and/or removable data storage devices illustrated in FIG. 9, or other data storage or data communications devices. The computer program may be loaded into the memory 992 to configure the processor 940 of FIG. 9, for execution. The computer program comprises instructions which, when read and executed by the processor 940 of FIG. 9 causes the processor 940 to perform the steps necessary to execute the steps or elements of the present invention.

Figure 10:
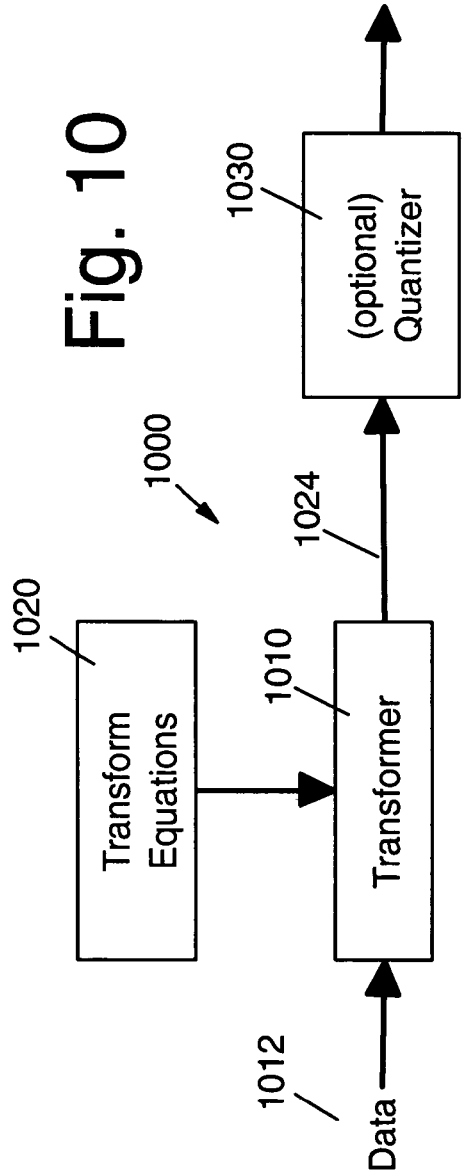
FIG. 10 is a block diagram of a data analyzing system according to the preferred embodiment of the present invention.

FIG. 10 illustrates a data analyzing system 1000 according to the present invention. In FIG. 10, a transformer 1010 receives a block of data 1012 to be analyzed. The transformer 1010 uses transform equations 1020 which implement an FDCT which compensates for truncation errors introduced in performance of the transform equations, for example an FDCT such as illustrated in FIG. 6 or 7, in order to generate transformed data 1024. The transformed data 1024 is then quantized by quantizer 1030, and as part of quantization the result is rounded using a rounding value which is determined based on truncation amount which may have been introduced into the transformed data.

Figure 11:
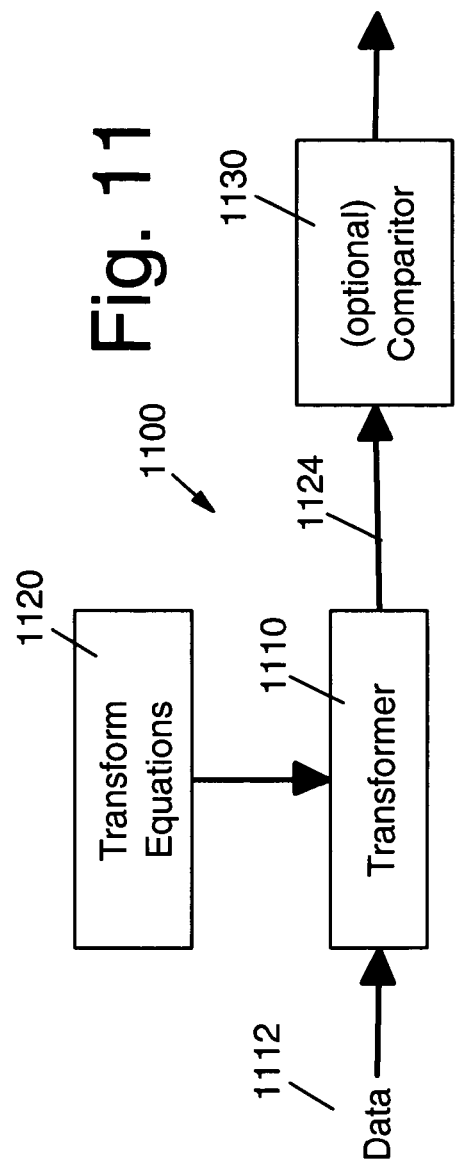
FIG. 11 is a block diagram of a data comparison system according to the preferred embodiment of the present invention.

FIG. 11 illustrates another data analyzing system 1100 according to the present invention. In FIG. 11, a transformer 1110 receives a block of data 1112 to be analyzed. The transformer 1110 uses transform equations 1120 to generate transformed data 1124. The transformer 1110 uses transform equations 1120 which implement an FDCT which compensates for truncation errors introduced in performance of the transform equations, for example an FDCT such as illustrated in FIG. 6 or 7, in order to generate transformed data 1124. The transformed data 1124 is then compared to comparison values in comparator 1130.

Thus, the present invention provides a method, apparatus, and article of manufacture for controlling truncation error which is introduced when performing a transform equation as a result of lowering the precision of elements of the equation using shift right operations. This is achieved by associating a predetermined truncation amount with a plurality of operations of the transform equation and defining an ordered set of the operations to perform the transform which control the truncation error in the result if each operation introduced the predetermined truncation amount associated with it. Accordingly the transform is performed using the defined ordered set. For example the pre-determined truncation error could be an average truncation error.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

We claim:

1. A computer implemented method of reducing an error in an output of a digital image processed using a discrete cosine transform equation, the method comprising:

receiving the digital image for processing using the discrete cosine transform equation;

determining integer numerators and floating point denominators to approximate floating point coefficients of sub-transforms of the discrete cosine transform equation;

determining truncation errors generated from performing multiplication operations using the integer numerators, wherein the multiplication operations are implemented as shift right bit operations;

approximating a cumulative error in an output of the discrete cosine transform equation based on the truncation errors generated from performing the multiplication operations in the sub-transforms;

modifying at least one of the sub-transforms in the discrete cosine transform equation by changing at least one of an addition operation to a subtraction operation and a subtraction operation to an addition operation performed within the at least one of the sub-transforms to reduce the cumulative error in the output of the discrete cosine transform equation;

generating a modified discrete cosine transform equation including the modified at least one sub-transform; and processing the digital image using the modified discrete cosine transform equation to generate the output.

2. The computer implemented method of claim 1 wherein determining the truncation errors further comprises using a probability distribution of a value of the floating point coefficients of the sub-transforms.

3. The computer implemented method of claim 1 further comprising:

receiving a digital image having known cumulative errors; and modifying at least one of the sub-transforms in the discrete cosine transform equation based on the known cumulative errors in the digital image.

4. The computer implemented method of claim 1 wherein the discrete cosine transform equation is at least one of a forward discrete cosine transform and an inverse discrete cosine transform.

5. The computer implemented method of claim 1 wherein processing the digital image further comprises:

processing the digital image using the modified discrete cosine transform equation to generate an intermediate output; and truncating the intermediate output to an integer value based on the approximated cumulative error to generate the output.

6. The computer implemented method of claim 1 wherein processing the digital image further comprises:

processing the digital image using the modified discrete cosine transform equation to generate an intermediate output;

quantizing the intermediate output to generate a quantized output; and truncating the quantized output to an integer value based on the approximated cumulative error and a quantization value to generate the output.

7. An apparatus for reducing an error in an output of a digital image processed using a discrete cosine transform equation, the apparatus comprising:

a processor configured to receive the digital image for processing using the discrete cosine transform equation to determine integer numerators and floating point denominators to approximate floating point coefficients of sub-transforms of the discrete cosine transform equation, and to determine truncation errors generated from performing multiplication operations using the integer numerators, wherein the multiplication operations are implemented as shift right bit operations; and a transformer configured to approximate a cumulative error in an output of the discrete cosine transform equation based on the truncation errors generated from performing the multiplication operations in the sub-transforms, to modify at least one of the sub-transforms in the discrete cosine transform equation by changing at least one of an addition operation to a subtraction operation and a subtraction operation to an addition operation performed within the at least one of the sub-transforms to reduce the cumulative error in the output of the discrete cosine transform equation, to generate a modified discrete cosine transform equation including the modified at least one sub-transform, and to process the digital image using the modified discrete cosine transform equation to generate the output.

8. The apparatus of claim 7 wherein the processor is further operable to use a probability distribution of a value of the floating point coefficients of the sub-transforms.

9. The apparatus of claim 7 wherein:

the processor is further operable to receive a digital image having known cumulative errors; and the transformer is further operable to modify at least one of the sub-transforms in the discrete cosine transform equation based on the known cumulative errors in the digital image.

10. The apparatus of claim 7 wherein the discrete cosine transform equation is at least one of a forward discrete cosine transform and an inverse discrete cosine transform.

11. The apparatus of claim 7 wherein the transformer is further operable to:

process the digital image using the modified discrete cosine transform equation to generate an intermediate output; and truncate the intermediate output to an integer value based on the approximated cumulative error to generate the output.

12. The apparatus of claim 7 wherein the transformer is further operable to:

process the digital image using the modified discrete cosine transform equation to generate an intermediate output;

quantize the intermediate output to generate a quantized output; and truncate the quantized output to an integer value based on the approximated cumulative error and a quantization value to generate the output.

13. A computer readable storage medium tangibly embodying programmed instructions which, when executed by a computer system, are operable for performing a method of reducing an error in an output of a digital image processed using a discrete cosine transform, the method comprising:

receiving the digital image for processing using the discrete cosine transform equation;

determining integer numerators and floating point denominators to approximate floating point coefficients of sub-transforms of the discrete cosine transform equation;

determining truncation errors generated from performing multiplication operations using the integer numerators, wherein the multiplication operations are implemented as shift right bit operations;

approximating a cumulative error in an output of the discrete cosine transform equation based on the truncation errors generated from performing the multiplication operations in the sub-transforms;

modifying at least one of the sub-transforms in the discrete cosine transform equation by changing at least one of an addition operation to a subtraction operation and a subtraction operation to an addition operation performed within the at least one of the sub-transforms to reduce the cumulative error in the output of the discrete cosine transform equation;

generating a modified discrete cosine transform equation including the modified at least one sub-transform; and processing the digital image using the modified discrete cosine transform equation to generate the output.

14. The computer readable storage medium of claim 13 wherein determining the truncation errors further comprises using a probability distribution of a value of the floating point coefficients of the sub-transforms.

15. The computer readable storage medium of claim 13 further comprising:

receiving a digital image having known cumulative errors; and modifying at least one of the sub-transforms in the discrete cosine transform equation based on the known cumulative errors in the digital image.

16. The computer readable storage medium of claim 13 wherein the discrete cosine transform equation is at least one of a forward discrete cosine transform and an inverse discrete cosine transform.

17. The computer readable storage medium of claim 13 wherein processing the digital image further comprises:

processing the digital image using the modified discrete cosine transform equation to generate an intermediate output; and truncating the intermediate output to an integer value based on the approximated cumulative error to generate the output.

18. The computer readable storage medium of claim 13 wherein processing the digital image further comprises:

processing the digital image using the modified discrete cosine transform equation to generate an intermediate output;

quantizing the intermediate output to generate a quantized output; and truncating the quantized output to an integer value based on the approximated cumulative error and a quantization value to generate the output.

* * * * *